(12) United States Patent
Karr et al.

(10) Patent No.: US 12,450,448 B1
(45) Date of Patent: Oct. 21, 2025

(54) SELECTABLE RADIO FREQUENCY IDENTIFICATION TRANSPONDER

(71) Applicant: STAR Systems International Limited, Hong Kong (CN)

(72) Inventors: Robert William Karr, Hong Kong (CN); Tarun Ahlawat, Hong Kong (CN)

(73) Assignee: STAR SYSTEMS INTERNATIONAL LIMITED, Hong Kong (CN)

( * ) Notice: Subject to any disclaimer, the term of this patent is extended or adjusted under 35 U.S.C. 154(b) by 0 days.

(21) Appl. No.: 18/764,443

(22) Filed: Jul. 5, 2024

(51) Int. Cl.
*G06K 7/10* (2006.01)

(52) U.S. Cl.
CPC ..... *G06K 7/10227* (2013.01); *G06K 7/10297* (2013.01)

(58) Field of Classification Search
CPC .............. G06K 7/10227; G06K 7/10297
USPC ........................................... 235/451
See application file for complete search history.

(56) References Cited

U.S. PATENT DOCUMENTS

| | | | |
|---|---|---|---|
| 2007/0229267 A1* | 10/2007 | Traub | H04L 67/34 340/572.1 |
| 2011/0226859 A1* | 9/2011 | Chen | G06K 19/07703 235/492 |
| 2011/0273273 A1* | 11/2011 | Liu | G06K 19/0724 340/10.1 |
| 2011/0285511 A1* | 11/2011 | Maguire | H01Q 1/2225 340/10.1 |
| 2015/0048159 A1* | 2/2015 | Martinez de Velasco Cortina | G06Q 20/28 235/379 |

* cited by examiner

*Primary Examiner* — Ahshik Kim
(74) *Attorney, Agent, or Firm* — Bayramoglu Law Offices LLC

(57) ABSTRACT

The provided are a selectable multi-frequency radio frequency identification (RFID) transponder as well as a non-mechanical method to change an identification code of a selectable multi-frequency RFID transponder. The selectable multi-frequency RFID transponder includes a multi-frequency chip, a first antenna, and a second antenna. The method includes: connecting wirelessly the selectable multi-frequency RFID transponder; establishing a short range link between the selectable multi-frequency RFID transponder and a hand-held terminal; and changing the identification code of the selectable multi-frequency RFID transponder through a mobile application.

16 Claims, 3 Drawing Sheets

SELECTABLE RADIO FREQUENCY IDENTIFICATION TRANSPONDER

TECHNICAL FIELD

The present disclosure relates to a Radio Frequency Identification (RFID) transponder.

BACKGROUND

RFID is a technique used to identify objects by means of electromagnetic waves or radio frequency. An object may be tagged with an electronic code responding label. A common electronic code responding label comprises an antenna and an Integrated Circuit (IC) chip.

In practice, RFID provides a quick and affordable means to identify objects. Upon receiving a valid interrogating signal from an interrogating source, such as from an interrogating antenna (or "transmitting and receiving antenna") of an RFID reader, the electronic code responding label responds according to its designed protocol. As the electronic code responding label has a unique identification code which relates to the object that the electronic code responding label is attached to, by communicating with the electronic code responding label to retrieve the unique identification code representing the object, one may identify the presence of the object simply by identifying the presence of the electronic code responding label. An electronic code responding label sometimes is known as a label, a tag, or a transponder, etc.

There are mainly two types of RFID transponders, active and passive. An active RFID transponder would have its own battery source, has a greater read range than a passive RFID transponder. However, an active RFID transponder is limited by the lifetime of its battery, and is more expensive and bulkier (with a casing or housing) than a passive RFID transponder. A passive RFID transponder, on the other hand, is a transponder energised by an interrogating signal from an interrogating source (such as an RFID reader). It has a relatively shorter read range but has the advantage of much cheaper price, much smaller form factor (in the form of a thin label), and the convenience of not needing replacement (as there is no battery needed) as compared with an active RFID transponder.

Common operating frequency band of RFID communication includes low frequency (LF) band, high frequency (HF) band, ultra-high frequency (UHF) band, and microwave band. The global UHF RFID frequency band (e.g. Electronic product code (EPC) Class 1 Gen 2/ISO 18000-6C standard) covers 860-960 MHz. For Europe, the ETSI band covers 865-868 MHz. In USA, the FCC band covers 902-928 MHz.

Apart from the conventional logistics and supply chain industries, RFID is an emerging technology in different industries for many applications such as Automatic Vehicle Identification (AVI) systems, congestion control, or Electronic Toll Collection (ETC) systems, traffic management, smart cities, etc. In the field of AVI and ETC, an AVI RFID transponder with a unique ID is attached to a vehicle, in a form of windshield tag, a headlamp tag, a car-plate tag, a rear-view mirror hang tag, vehicle roof tag, or other possible forms. When the tagged vehicle is passing through a designated read zone of an RFID reader, the tagged vehicle is automatically detected and identified, and therefore road toll can be charged accordingly.

AVI RFID transponders are also used in High-Occupancy Vehicle lanes (also known as HOV lanes, carpool lanes, diamond lanes, 2+ lanes, transit lanes or T2 or T3 lanes) and High Occupancy Toll lanes (HOT lanes). HOV lanes are restricted traffic lanes reserved for the exclusive use of vehicles with a driver and at least one passenger, including carpools, vanpools, and transit buses. Some HOV lanes require a driver and at least two passengers. These restrictions may be only applied during peak travel times or may be applied at all times. HOT lanes are similar to HOV lanes in that higher occupancy vehicle will attract a better toll rate than a lower occupancy vehicle. AVI RFID transponders, especially selectable or switchable RFID transponders, facilitate the enforcement of HOV lanes and also the toll collection of HOT lanes. Selectable RFID transponders are a special type of RFID transponders. Theoretically, a selectable transponder is a set of multiple tags with only one selected tag is active and the rest (non-selected) are inactive. Some practical examples of selectable transponder may have only one antenna but more than one RFID chips. Typically, only one of the RFID chips is active at one time for operation, and the rest of the RFID chips are being inactive or shielded. To achieve this, existing selectable RFID transponders switch from one chip to the other, by having a pushing, sliding or a rotary mechanism to physically move the intended chip to interact (by capacitive coupling or direct contact) with the antenna terminals while moving the non-intended chip(s) away. Alternatively, the non-intended chip(s) may be blocked using metallic shield(s) actuated by a pushing, sliding or a rotary mechanism.

The present disclosure provides an alternative design of an improved selectable RFID transponder with characteristics described with greater details in this specification.

SUMMARY

According to a first aspect of the present disclosure, there is provided a multi-frequency radio frequency identification (RFID) transponder, comprising: a multi-frequency chip containing an identification code; a first antenna, operated at a first frequency band, connected to the multi-frequency chip; and a second antenna, operated at a second frequency band different from the first frequency band, connected to the multi-frequency chip; wherein the first antenna, the second antenna and the multi-frequency chip are configured and arranged such that the RFID transponder is readable by an RFID reader at the first frequency band to obtain the identification code; and the RFID transponder is controllable by a terminal different from the RFID reader at the second frequency band to change the identification code.

In one form, the identification code is a unique code made up of EPC memory and/or user memory of the multi-frequency chip.

In one form, the first frequency band is a UHF band and the second frequency band is an HF band.

In one form, the first antenna is a UHF dipole-type antenna and the second antenna is an HF/NFC coil.

In one form, the terminal is a hand-held mobile device.

In one form, the hand-held mobile device is a mobile phone, a smart device or an HF/NFC enabled device.

In one form, the multi-frequency RFID transponder is a dual-frequency RFID transponder.

In one form, the multi-frequency RFID transponder is a selectable vehicle RFID transponder.

In one form, the selectable vehicle RFID transponder switches between two or more different unique identification codes.

In one form, the multi-frequency RFID transponder is a passive RFID transponder.

According to a second aspect of the present disclosure, there is provided a method to change an identification code of a multi-frequency radio frequency identification (RFID) transponder, the multi-frequency RFID transponder is readable by an RFID reader at a UHF band to obtain the identification code; the method comprising: connecting wirelessly the multi-frequency RFID transponder through an HF/near field communications (NFC) antenna of the multi-frequency RFID transponder by magnetic induction or magnetic coupling; establishing an NFC link between the multi-frequency RFID transponder and a hand-held terminal through the HF/NFC antenna; and changing the identification code of the multi-frequency RFID transponder through a user interface or a mobile application or mobile APP on the hand-held terminal.

In one form, changing the identification code of the multi-frequency RFID transponder through the user interface or the mobile application on the handheld terminal comprising: reading and displaying a current identification code of the multi-frequency RFID transponder; selecting one choice of valid identification code from a list presented by the user interface or the mobile application; sending instructions to the multi-frequency RFID transponder to change the current identification code of the multi-frequency RFID transponder with the selected choice of valid identification code; and reading and displaying the newly selected choice of identification code of the multi-frequency RFID transponder.

In one form, the method further comprising: sending a notification confirming the newly selected choice of identification code to a preselected destination; and storing the notification for historical record.

In one form, the multi-frequency RFID transponder is attached to a vehicle, the method further comprising: identifying whether the vehicle is in motion using the mobile device; and disabling changing the identification code of the multi-frequency RFID transponder and displaying warning message through the user interface when the speed of the vehicle is above a preset threshold unless user intentionally bypass this safety feature on his/her own responsibility. In one form, the warning message is also presented in audio.

In one form, the multi-frequency RFID transponder is attached to the windshield of a vehicle.

BRIEF DESCRIPTION OF THE DRAWINGS

Embodiments of the present disclosure will be discussed with reference to the accompanying drawings wherein.

DETAILED DESCRIPTION OF THE EMBODIMENTS

Figure 1:
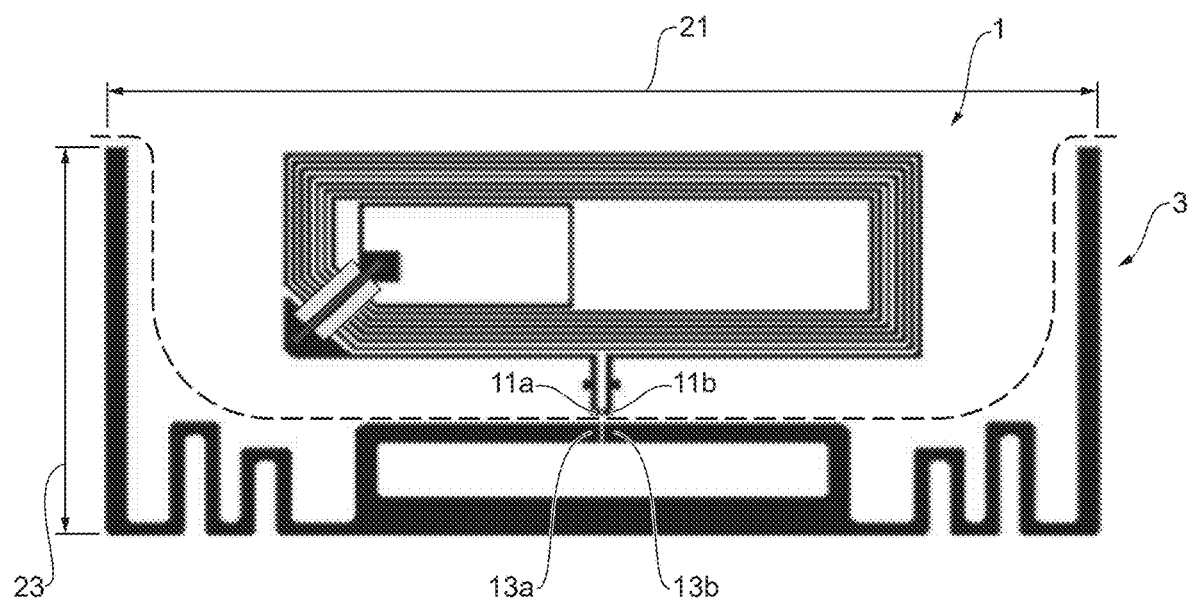
FIG. 1 depicts a RFID transponder according to one embodiment of the present disclosure.

FIG. 1 depicts a RFID transponder according to one embodiment of the present disclosure. In this embodiment, the RFID transponder comprises two antennas, an HF antenna (or coil) 1, and a UHF antenna 3. To illustrate the terminals 11a and 11b of the HF antenna (or coil) 1, and also the terminals 13a and 13b of the UHF antenna 3, the RFID chip of the RFID transponder has been removed. In practice, a single RFID chip operating in both HF and UHF would be connected to the terminals 11a and 11b of the HF antenna (or coil) 1, and the terminals 13a and 13b of the UHF antenna 3.

In this embodiment, the HF antenna (or coil) 1 is a multiple-loop antenna (or coil). There are many other possible designs for the HF antenna (or coil) 1 as long as the HF antenna (or coil) enables the RFID chip to operate in the HF band. In this embodiment, the UHF antenna 3 is a dipole-type antenna with a loop in the middle of the two dipole arms (or meandering arms). There are many other possible designs for the UHF antenna 3 as long as the UHF antenna enables the RFID chip to operate in the UHF band. The overall dimension of the RFID transponder is presented by overall length 21 and overall width 23. In one form, the overall length 21 is 70 mm and the overall width 23 is 30.45 mm.

With the antenna arrangement as shown in FIG. 1, the HF antenna (or coil) 1 enables the RFID chip (not shown) connected to the terminals to 11a and 11b of the HF antenna (or coil) 1 to operate in the HF band. Similarly, the UHF antenna 3 enables the RFID chip (not shown) connected to the terminals to 13a and 13b of the UHF antenna 3 to operate in the UHF band.

More generally, the present disclosure presents a multi-frequency RFID transponder. This multi-frequency RFID transponder comprises a multi-frequency chip containing an identification code, a first antenna, operated at a first frequency band, connected to the multi-frequency chip, and also a second antenna, operated at a second frequency band different from the first frequency band, connected to the multi-frequency chip. The first antenna, the second antenna and the multi-frequency chip are configured and arranged such that the RFID transponder is readable by an RFID reader at the first frequency band to obtain the identification code; and the RFID transponder is controllable by a terminal different from the RFID reader at the second frequency band to change the identification code.

The term "multi-frequency" means that the RFID transponder operates in at least two distinctive frequency bands. Common RFID frequency bands include LF band at 125-135 kHz, HF band at 13.56 MHz, UHF band at 860-960 MHz, and Microwave at 2.45 GHz. Of course, other frequency bands are possible. Similarly, a "multi-frequency" chip refers to an RFID chip that works in at least two frequency bands. The multi-frequency chip may be a single chip with a pair of antenna terminals, a single chip with two or more sets of antenna terminals, or it may take a form of two or more separate modules (one for each band) sharing a same memory containing the identification code of the RFID transponder. Some examples of memory may be random access memory (RAM), static random access memory (SRAM), read only memory (ROM), or programmable read only memory (PROM), erasable programmable read only memory (EPROM), electrically erasable programmable read only memory (EEPROM), etc.

The "identification code" may take the form of an Electronic Product Code (EPC), which is a universal identifier that gives a unique identity to a specific physical object. This identity is designed to be unique among all physical objects and all categories of physical objects in the world, for all time. Alternatively, the identification code may take the form of proprietary code or accordingly to other standards, as long as the identification code may provide an identification. In the case of an existing selectable RFID transponder for HOT lanes, an identification code is used to indicate that the car is with one occupancy (single driver); a second identification code different from the first is used to indicate that the car is with two occupancies (one driver and one passenger); and a third identification code different from the first and second is used to indicate that the car is with more than two occupancies (one driver and two or more passengers). With the detection of the identification code, corresponding toll payment would then be deducted from a corresponding account on the back-end. The identification code of the multi-frequency RFID transponder of the present disclosure functions the same way or similarly.

With the configuration and arrangement of the first antenna, the second antenna and the multi-frequency chip of the present disclosure, the RFID transponder of the present disclosure is readable by an RFID reader at the first frequency band to obtain the identification code; and the RFID transponder is controllable by a terminal different from the RFID reader at the second frequency band (different from the first frequency band) to change the identification code.

The terminal different from the RFID reader may be a hand-held smart device, mobile phone device or any device that has an ability to communicate with the multi-frequency RFID transponder wirelessly. For example, the terminal may be a device with NFC capabilities, Bluetooth or Bluetooth Low Energy (BLE), Ultra-Wideband (UWB), Zigbee, Wi-Fi, Infra-red, NearLink, etc.

Accordingly, compared with existing selectable RFID transponders, the multi-frequency RFID transponder of the present disclosure offers a completely different way of changing the identification code. In particular, it provides a non-mechanical method of changing the identification code and the multi-frequency RFID transponder only requires one chip as normal passive transponder and does not require additional component such as shielding pads, metal springs or gears, rotating or sliding parts, casing or housing. In addition, the multi-frequency RFID transponder retain the advantages of common passive RFID transponder of being small in form factor and low-profile.

Further, because the multi-frequency RFID transponder of the present disclosure has a simpler structure and with fewer components than existing selectable RFID transponders, the manufacturing and shipping costs can be reduced significantly. The multi-frequency RFID transponder of the present disclosure is also less bulky than existing selectable RFID transponders.

Figure 2:
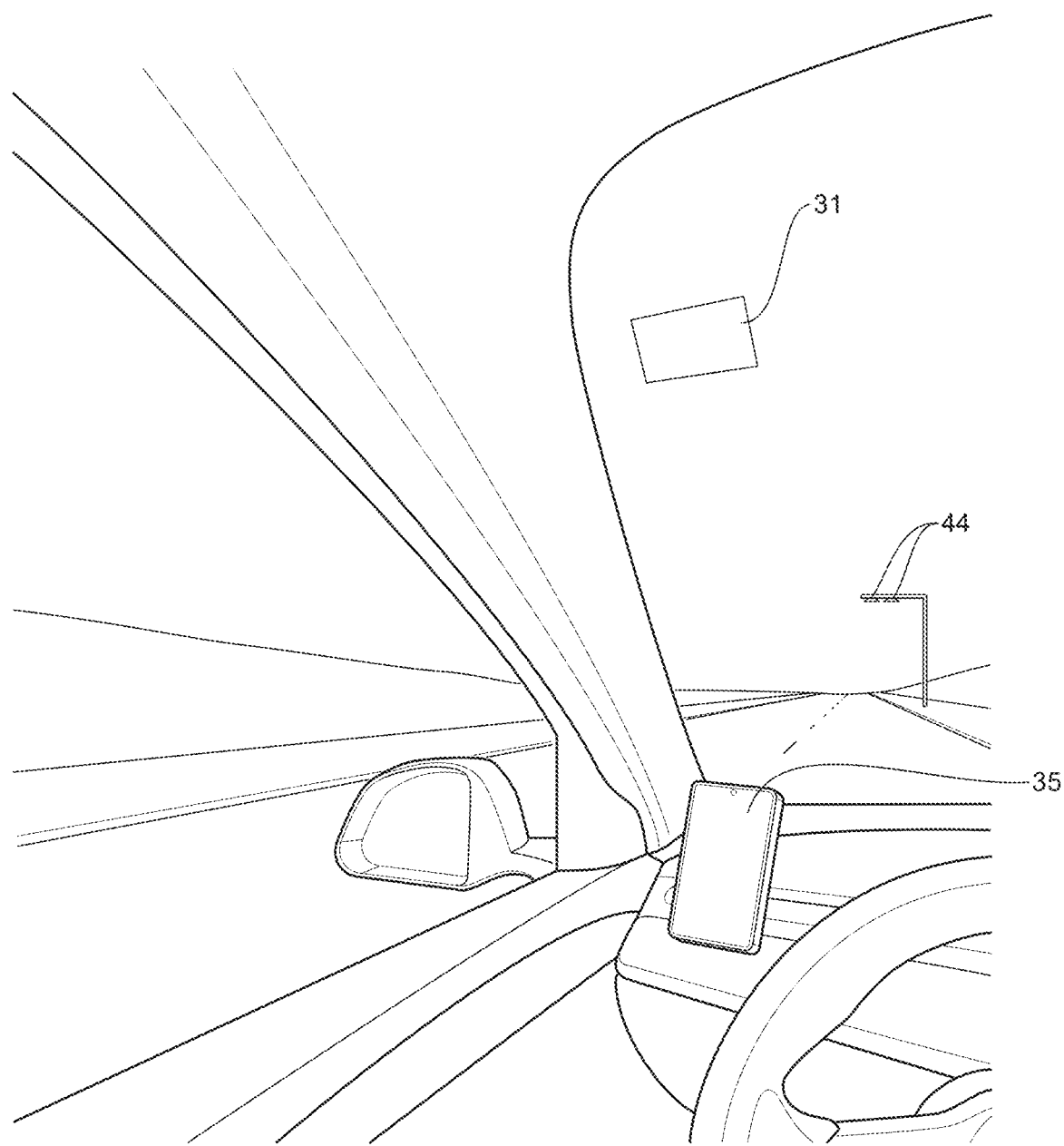
FIG. 2 depicts an exemplary application of a RFID transponder according to one embodiment of the present disclosure in a vehicle.

FIG. 2 shows an example of the application of a multi-frequency RFID transponder of one embodiment of the present disclosure. In this example, a multi-frequency RFID transponder 31 is attached (usually interior) on the windscreen of a car. A terminal in the form of a mobile phone 35 is used to change the identification code of the multi-frequency RFID transponder 31 when the car is not in motion. For example, initially the identification code is a code used to represent a single occupant (driver only). When the number of occupants of the car changes to be more than two people (driver and more than one passenger), then the mobile phone 35 is used to establish a link (an HF/NFC link) with the multi-frequency RFID transponder 31 to change the identification code to a code used to represent more than two occupants. A HOT lane (or HOV lane) is with RFID reader antenna installed, for example reader antennas 44 installed on an overhead support. When the car enters the HOT lane (or HOV lane) and driven pass the read zone of reader antennas 44, the reader antennas 44 establish a link (a UHF RFID link) with the multi-frequency RFID transponder 31 and reads the identification code representing more than two occupants. Appropriate toll fee is then deducted from the corresponding account on the back-end.

In this embodiment, the mobile phone 35 uses HF band to change the identification code of the multi-frequency RFID transponder 31 (when the mobile phone 35 is in close proximity with the multi-frequency RFID transponder 31) while the with RFID reader antennas 44 uses UHF band to read the identification code of the multi-frequency RFID transponder 31. The read range of HF band is typically very short from few cm to less than 10 cm. The read range of UHF band is typically longer in the range of 30 cm to 10 m or so.

In one embodiment, the mobile phone 35 also monitor the speed of the car. As an extra safety feature, changing the identification code of the multi-frequency RFID transponder through the user interfaces is disabled when the speed of the vehicle is above a preset safety threshold unless user intentionally bypass this safety feature on his/her own responsibility. Meanwhile, the user interface is displaying a warning message if the vehicle is in motion with speed above a preset threshold. Alternatively, a warning audio may be provided to replace the warning message, or may be provided together with the warning message.

While the example shown in FIG. 2 is in relation to a car, the same application can be applied to any vehicle, such as a sedan, a minivan, a van, an SUV, a truck, a bus, a wagon, a motorbike, a boat, an aircraft, an elevator, a train, a train compartment, unmanned vehicle, drone, etc.

While it is envisaged that the multi-frequency RFID transponder 31 is a passive RFID transponder, the multi-frequency RFID transponder 31 can also take the form of an active RFID transponder and semi-active or semi-passive transponder.

The mobile phone 35 may change the identification code through a mobile APP or a proprietary software. The mobile APP or proprietary software may communicate with a server to authenticate a code prior to changing the identification code of the multi-frequency RFID transponder 31. In one form, the mobile APP or proprietary software may first obtain a list of approved codes from a server. Then a user can select one of the approved codes from the list presented by the mobile APP or a proprietary software so that the mobile APP or a proprietary software will carry out the operation to read the multi-frequency RFID transponder 31 and change its identification code to the one selected from the list. While changing the identification code, internet access from the mobile phone 35 is not necessary.

Figure 3:
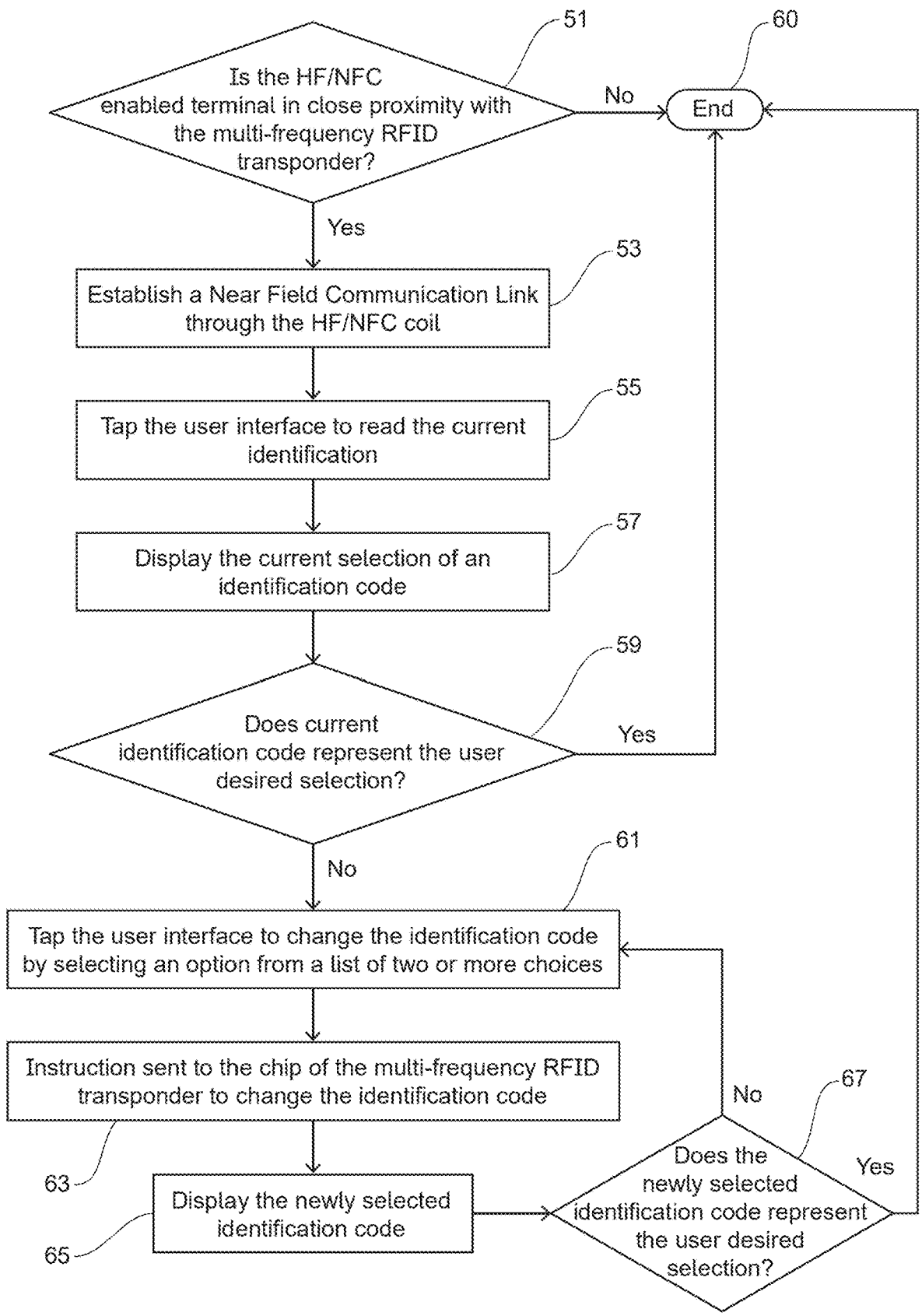
FIG. 3 depicts an exemplary flow diagram of the working of changing an identification code of a RFID transponder using a terminal according to one embodiment of the present disclosure.

FIG. 3 depicts an exemplary flow diagram of the working of changing an identification code of a multi-frequency RFID transponder chip using a terminal according to one embodiment of the present disclosure. It is understood that the flow in FIG. 3 starts when the vehicle is not in motion or moving slowly with speed below a preset safety threshold. In this exemplary embodiment, the terminal is a HF/NFC enabled terminal in the form of a mobile phone. The first step is to check whether the HF/NFC enabled terminal is in close proximity with the multi-frequency RFID transponder 51. If the terminal is not in close proximity of the multi-frequency RFID transponder 51, then the process proceeds to an end 60. If the terminal is in close proximity of the multi-frequency RFID transponder, then the process proceeds to establish an NFC link between the multi-frequency RFID transponder and the terminal through the HF/NFC coil of the multi-frequency RFID transponder 53. When an NFC link is established through the HF/NFC coil in the multi-frequency RFID transponder, a user of the terminal taps a user interface to read the current identification code of the multi-frequency RFID transponder 55. The identification code is then displayed on the user interface 57. If the identification code is correct (means the identification codes represent user desired selection), no change in the identification code is necessary, then the process proceeds to an end 60. In an instance where the identification code is different to the user's desired selection 59, the user may choose to change the identification code by selecting an option from the list of two or more choices 61. An instruction to change the identification code is sent to the chip of the multi-frequency RFID transponder 63 and the newly selected identification code is displayed on the user interface 65. In an instance where the user's new selection is not the user's desired selection 67, the user can tap on the interface to change the identification code accordingly and choose the appropriate identification code from the lists of options 61. Steps 61 to 67 repeat until the desired selection is displayed, then the process proceeds to an end 60.

When the new identification code is selected (step 61), a notification is generated confirming the change in the identification code. The confirmatory notification is then stored in a preselected destination and serves as a historical record.

In one embodiment, it is possible that the steps in FIG. 3 be voice assisted with the implementation of a voice system. For example, displaying the identification code on the user interface (steps indicated by 57 and 65) may be accompanied by synthesized voice reading out the displayed information. Further, the voice system may interact with the user by listening to the user and prompting the user for instructions. The voice system may be AI based.

The reference to any prior art in this specification is not, and should not be taken as, an acknowledgement or any form of suggestion that such prior art forms part of the common general knowledge.

It will be understood that the terms "comprise" and "include" and any of their derivatives (e.g. comprises, comprising, includes, including) as used in this specification, and the claims that follow, is to be taken to be inclusive of features to which the term refers, and is not meant to exclude the presence of any additional features unless otherwise stated or implied.

In some cases, a single embodiment may, for succinctness and/or to assist in understanding the scope of the disclosure, combine multiple features. It is to be understood that in such a case, these multiple features may be provided separately (in separate embodiments), or in any other suitable combination. Alternatively, where separate features are described in separate embodiments, these separate features may be combined into a single embodiment unless otherwise stated or implied. This also applies to the claims which can be recombined in any combination. That is a claim may be amended to include a feature defined in any other claim. Further a phrase referring to "at least one of" a list of items refers to any combination of those items, including single members. As an example, "at least one of: a, b, or c" is intended to cover: a, b, c, a-b, a-c, b-c, and a-b-c.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A multi-frequency radio frequency identification (RFID) transponder, comprising:
   a multi-frequency chip containing an identification code;
   a first antenna, operated at a first frequency band, connected to the multi-frequency chip; and
   a second antenna, operated at a second frequency band different from the first frequency band, connected to the multi-frequency chip;
   wherein the first antenna, the second antenna, and the multi-frequency chip are configured and arranged, wherein the multi-frequency RFID transponder is readable by an RFID reader at the first frequency band to obtain the identification code; and the multi-frequency RFID transponder is controllable by a terminal different from the RFID reader at the second frequency band to change the identification code.

2. The multi-frequency RFID transponder according to claim 1, wherein the identification code is a unique code made up of electronic product code (EPC) memory, user memory, or both, of the multi-frequency chip.

3. The multi-frequency RFID transponder according to claim 1, wherein the first frequency band is an ultra-high frequency (UHF) band and the second frequency band is an HF band.

4. The multi-frequency RFID transponder according to claim 1, wherein the first antenna is a UHF dipole-type antenna and the second antenna is an HF/near field communications (NFC) coil.

5. The multi-frequency RFID transponder according to claim 1, wherein the terminal is a hand-held mobile device.

6. The multi-frequency RFID transponder according to claim 5, wherein the hand-held mobile device is a mobile phone, a smart device, or an HF/NFC enabled device.

7. The multi-frequency RFID transponder according to claim 1, wherein the multi-frequency RFID transponder is a dual-frequency RFID transponder.

8. The multi-frequency RFID transponder according to claim 1, wherein the multi-frequency RFID transponder is a selectable vehicle RFID transponder.

9. The multi-frequency RFID transponder according to claim 8, wherein the selectable vehicle RFID transponder switches between at least two different unique identification codes.

10. The multi-frequency RFID transponder according to claim 1, wherein the multi-frequency RFID transponder is a passive RFID transponder.

11. A method to change an identification code of a multi-frequency RFID transponder, the multi-frequency RFID transponder is readable by an RFID reader at a UHF band to obtain the identification code, wherein the method comprises:
    connecting wirelessly the multi-frequency RFID transponder through an HF/NFC antenna of the multi-frequency RFID transponder by magnetic induction or magnetic coupling;
    establishing an NFC link between the multi-frequency RFID transponder and a hand-held terminal through the HF/NFC antenna; and
    changing the identification code of the multi-frequency RFID transponder through a user interface or a mobile application on the hand-held terminal.

12. The method according to claim 11, wherein the step of changing the identification code of the multi-frequency RFID transponder through the user interface or the mobile application on the handheld terminal comprises:

reading and displaying a current identification code of the multi-frequency RFID transponder;
selecting one choice of valid identification code from a list presented by the user interface or the mobile application;
sending instructions to the multi-frequency RFID transponder to change the current identification code of the multi-frequency RFID transponder with the selected choice of valid identification code; and
reading and displaying the newly selected choice of identification code of the multi-frequency RFID transponder.

13. The method according to claim 11, further comprising:
sending a notification confirming a newly selected choice of identification code to a preselected destination; and
storing the notification for historical record.

14. The method according to claim 11, wherein the multi-frequency RFID transponder is attached to a vehicle, the method further comprises:
identifying whether the vehicle is in motion using a mobile device; and
disabling changing the identification code of the multi-frequency RFID transponder and displaying a warning message through the user interface when a speed of the vehicle is above a preset threshold unless a user intentionally bypass this safety feature on his/her own responsibility.

15. The method according to claim 11, wherein the multi-frequency RFID transponder is attached to a windshield of a vehicle.

16. The method according to claim 14, wherein the warning message is also presented in audio.

* * * * *